United States Patent [19]
Vargas

[11] Patent Number: 4,889,754
[45] Date of Patent: Dec. 26, 1989

[54] TEMPORARY WINDOW

[75] Inventor: Ky Vargas, Broken Arrow, Okla.

[73] Assignee: Temporary Windows, Inc., Tulsa, Okla.

[21] Appl. No.: 242,616

[22] Filed: Sep. 12, 1988

[51] Int. Cl.$^4$ .......................... B32B 7/06; B32B 7/12
[52] U.S. Cl. .................................... 428/41; 428/43; 296/95.1; 296/96.11
[58] Field of Search ............................ 428/41, 40, 43; 296/95.1, 96.11

[56] References Cited

U.S. PATENT DOCUMENTS

| | | | |
|---|---|---|---|
| 2,619,168 | 11/1952 | Leverence | 428/40 X |
| 3,950,580 | 4/1976 | Boudet | 428/41 |
| 4,090,464 | 5/1978 | Bishopp et al. | 428/40 |

Primary Examiner—Alexander S. Thomas
Attorney, Agent, or Firm—Robert B. Stevenson

[57] ABSTRACT

A multilayered transparent temporary window that can be conveniently and easily installed to cover the opening produced by a broken automobile window or the like comprising two superimposed layers of flexible transparent polymeric film adapted to cover and extend beyond the opening of the window with a thin film layer of transparent adhesive sandwiched between these layers, wherein at least one of the layers of flexible transparent film is perforated along a plurality of preselected lines that form sections or segments of film that can be peeled away, thus exposing the adhesive such as to bond the temporary window in place during use.

10 Claims, 4 Drawing Sheets

TEMPORARY WINDOW

BACKGROUND OF THE INVENTION

1. Field of the Invention:

This invention relates to a temporary window that can be used to cover and protect the hole left by a missing or broken glass in a window or the like. More specifically, but not by way of limitation, the invention relates to a multilayered transparent flexible film wherein at least one outer layer is perforated or precut to a selected pattern compatible with covering an automobile window or the like such that when selected portions of said perforated layer are peeled off, an inner layer of transparent adhesive is exposed to bond the transparent film in place over a broken or missing window.

2. Description of the Prior Art:

It is generally known and a common practice to employ a layer of plastic film to temporarily cover the opening or hole produced by a broken window glass or the like. Frequently, the plastic film will be tied or taped to the window or other structure surrounding the opening such as to temporarily cover the opening until permanently repaired with replacement glass. Such a procedure can be messy and very inconvenient to install and may require considerable effort to clean up after use. When the broken glass is an automobile window, additional concerns and problems are encountered. Unless the film is transparent, the desired visibility during driving will be impaired. If the film is loosely installed or of incorrect thickness, the sound produced during driving may be disruptive to the driver representing an additional risk. And the ability to seal the film reliably, such as to produce a moisture or rain impervious barrier, can be difficult. In view of these problems associated with the prior art, the need for an inexpensive yet functionally reliable temporary window system, particularly for broken automobile windows or the like exists. The present invention is viewed as providing such a temporary window.

SUMMARY OF THE INVENTION

The temporary window according to the present invention comprises at least two layers of transparent polymeric film held to each other by a thin middle layer of transparent adhesive, thus forming a multilayered transparent composite film. At least one of the outer layers of transparent polymeric film is perforated or precut along a series of preselected lines that allows strips or sections of that layer to be torn away and peeled off of the multilayered composite exposing the adhesive central layer. The overall shape and geometry of the multilayer composite and perforated lines are selected such as to be compatible with covering the opening of a window and adhesively bonding to the window frame or other structure surrounding the opening.

Thus, the present invention provides a temporary window comprising:

(a) a first layer of flexible transparent film cut to a preselected pattern corresponding to a shape adapted to cover and extend beyond the opening of a window;

(b) a thin film layer of transparent adhesive applied to one side of the first layer of flexible transparent film; and (c) a second layer of flexible transparent film cut to the same preselected pattern of the first layer of flexible transparent film, wherein the second layer of flexible transparent film is superimposed on the thin film layer of transparent adhesive applied to one side of the first layer of flexible transparent film thus forming a multilayer transparent composite and wherein at least one of the layers of flexible transparent film is precut along a plurality of preselected lines that form sections of the precut layer of flexible transparent film that can be peeled away thus exposing the adhesive such as to bond the temporary window in place during use.

Preferably, the flexible film layer to be peeled off is silicone coated on the side towards the adhesive, such as to make this layer a releasable liner. In one embodiment of the invention, the adhesive is chosen such that moisture or water will pacify the adhesive, thus any residual tackiness can be eliminated after installation. In this embodiment, the flexible liner need not be transparent, but instead can be completely removed during use of the temporary window.

It is an object of the present invention to provide a transparent temporary window that can be easily and readily used to cover and protect the hole or opening of a broken glass window, particularly a broken automobile window. It is a further object that this temporary window be sufficiently strong to withstand the air forces and wind associated with a moving automobile, yet not involve excessive and distracting noise during such use. It is still a further object to provide the above in a convenient and relatively inexpensive manner. Fulfillment of these objects and the presence and fulfillment of other objects will become apparent upon complete reading of the specification and claims taken in conjunction with the drawings.

DESCRIPTION OF THE PREFERRED EMBODIMENTS

The temporary window according to the present invention, how it is made and used and the associated advantages relative to previously known techniques to temporarily cover broken window glass can perhaps be best explained and understood by reference to the drawings.

Figure 1:
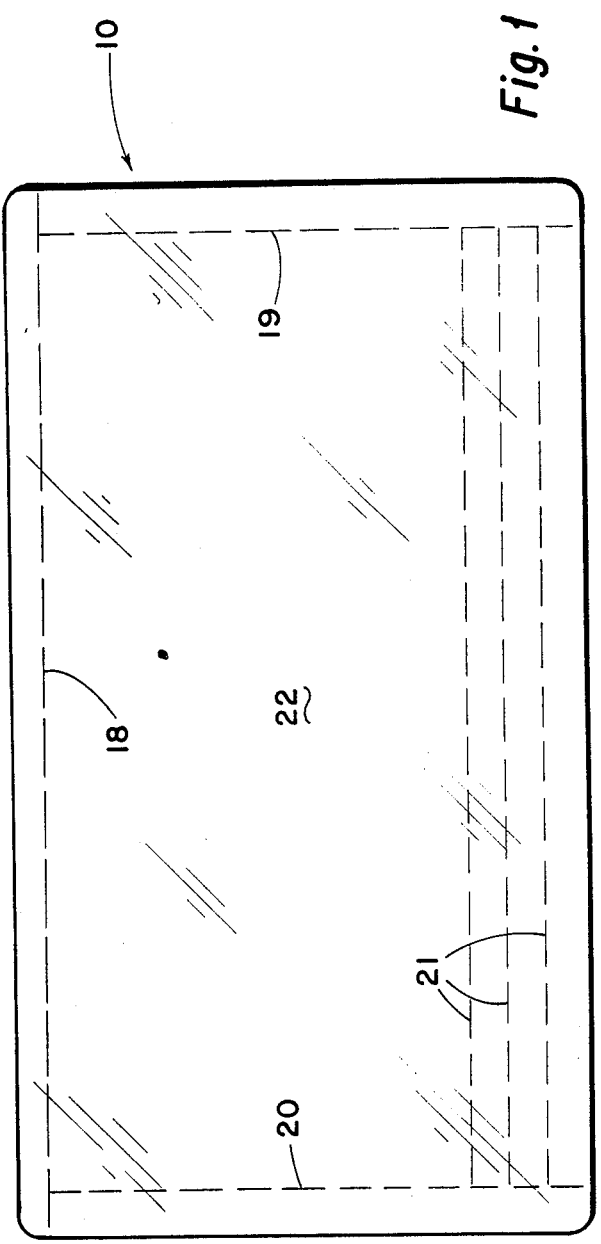
FIG. 1 illustrates a typical temporary window with preselected pattern corresponding to use on an automobile side window view when the transparent film is laid out on a flat surface.

FIG. 1 illustrates a typical temporary window according to the present invention prior to installation. As illustrated, the temporary window is preferably a multilayered transparent composite, generally designated by the numeral 10. As further seen in FIG. 2, the multilayered composite 10 is made up of three superimposed layers.

The top layer 12 is a relatively thick transparent film of flexible polymeric material. The bottom layer 14 is a similar relatively thin layer of transparent film again made from a flexible polymeric material. Sandwiched between the two transparent film layers 12 and 14 is a thin layer of transparent adhesive 16.

As seen in FIG. 1, the multilayered composite 10 contains a series of precut lines 18, 19, 20 and 21. These cuts are made such that they penetrate through the bottom film layer 14, but do not pass through the relatively thick top layer 12. Further, the overall geometry and size of the multilayered composite 10 is such that it will cover and extend beyond the opening of an automobile window (see FIGS. 3 through 8). The precut lines 18, 19, 20 and 21 divide the thin layer 14 into sections of flexible film that can be selectively peeled off, thus exposing the adhesive layer 16. To facilitate this process, the inner surface of thin film 14 is preferably coated with a silicone release agent or the like, thus making the individual sections of film 14 act as release liners.

Figure 7:
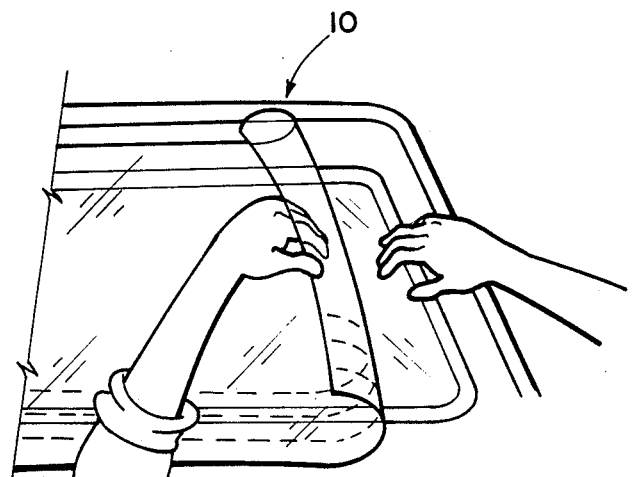
Figure 8:
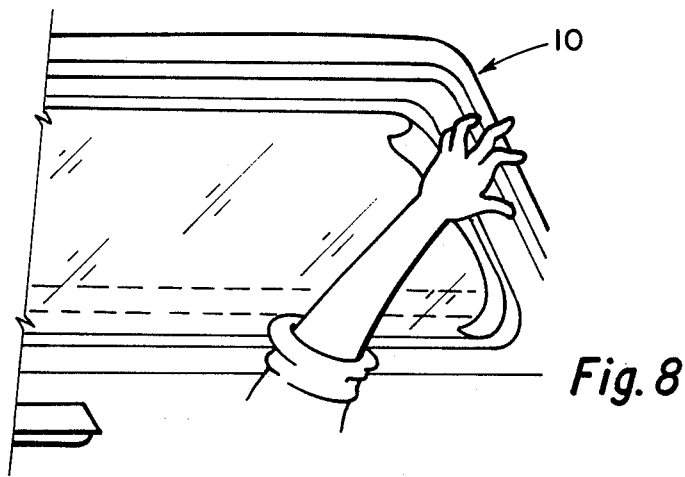

To use or install the temporary window illustrated in FIG. 1, the upper section of thin film 14, above the precut line 18 is peeled off and the entire window 10 is then adhesively pressed to the upper edge of an automobile window door frame (see FIG. 3) or the like. The section of thin film 14 to the left of precut line 20 is then peeled off (see FIG. 4) and the temporary window 10 is pressed against the left edge of the automobile door such that the adhesive bonds to the window frame. Similarly, the appropriate number of lower sections of the layer 14 defined by precut lines 21 are peeled off and the adhesive on the temporary window is pressed along the lower part of the door below the broken window (see FIG. 5). The front edge of the temporary window is then either trimmed (see FIG. 6) or folded around the front of the door and again, the strip of layer 14 to the right of precut 19 is peeled off creating the necessary adhesive bond sufficient to attach the front of the temporary window to the automobile door or as illustrated in FIGS. 7 and 8 adhesive associated with the central section 22 can be used. This is accomplished by separating the top layer from the liner along the front edge of the central section 22 of the temporary window (see FIG. 7) and then pushing the liner into the window opening. The top layer is then stretched and firmly bonded to the leading edge of the automobile door and the liner can then be smoothed back in place against the top layer. In this manner, the temporary window can be adhesively bonded around the window frame sealing the opening of the window.

It should be appreciated that the temporary window and the method of installing can vary according to the specific application involved. Thus, the overall shape and size of the window can vary; for example, notches can be provided at the lower corners to accommodate various sizes of windows. It should be further appreciated that the description of the method of installing the window involved right (top) and left (rear) edge justification in the automobile door but could have been equal being illustrated as front or bottom justified depending on the starting position, which side of the auto is involved, and which edge is to receive the multiple precut section portion of the temporary window.

The actual manufacturing of the multilayered composite temporary window according to the present invention can be by any of the methods generally known in the art to fabricate laminated polymer film and the like. As such, the adhesive can be applied to either of the outer flexible film layers prior to superimposing one on the other. The cutting of the preselected pattern or shape of the temporary window can be after the lamination step, concurrent therewith or in part prior to laminating, as again generally known in the art.

Similarly, the precutting or perforating of the tear away and peel off sections, segments or strip associated with the layer of flexible film that represents the liner can also be done either before or after lamination. Preferably, the silicone or the like is applied to the inner face of the film liner and adhesive is then applied to either the silicone coated side or the inner side of the transparent layer and the composite laminate is formed before any perforation or cutting is performed. The overall temporary window can then be cut out and the edges of the tear away section can be formed by preferably kiss cutting through the liner film layer. Typically, the liner layer having preferably a silicone coating on the inner surface will be from about 1 mil thickness up to about 3 mils thick; however, thicker layers could in principle be employed. Preferably a 1.5 mil to about 2.0 mil polyester or biaxially oriented polypropylene film is used as the liner film. The unperforated layer is preferably thicker, typically from about a few mils up to about 10 mils. Preferably, either polyester or biaxially oriented polypropylene of from about 5 to 7 mils is used. In the case of kiss cutting through the thinner liner layer, the unperforated layer is of sufficient extra thickness (e.g. 0.5 mil or greater) to tolerate some penetration during kiss cutting. For the preferred automobile window application, a 3 mil top layer with a 2 mil liner layer and about 1 mil film of adhesive (i.e., a 6 mil total thickness) results in the onset of a perceptible suppression of wind noise during use which continues to improve up to about 10 mil total thickness.

The layers of flexible film useful in the present invention can generally be any of the corresponding plastic films as generally known in the art. Preferably, the transparent film layers are to be selected from the group consisting of, but not limited to, polyesters such as transparent film grade polyethylene terephthalate and related copolymers, including blends with polystyrene or the like; certain transparent grades of polyolefins such as polyethylene and/or polypropylene and in particular, biaxially oriented polypropylene; acrylics such as film grade polymethylmethacrylate and related copolymers and film based on or containing polystyrene as previously recited. Preferably, the layer to be peeled off or torn away thus exposing the adhesive has a non-stick coating on the side facing the adhesive. Generally, the release agent can be any such material as known in the art. Preferably, a silicone release agent is employed. In the case where the tear away layer is only partly removed (i.e., in the case of perforated or precut segments), the liner film layer should also be of a transparent polymeric film. It should be appreciated that in the case of liner layer being completely removed, the liner film layer does not have to be transparent and can be manufactured from a much broader selection of materials including but not limited to paper or cloth, as well as polymer film. In such embodiments, the use of the water or moisture pacified adhesive is preferred, but not always necessary.

The adhesive to be used according to the present invention can generally be any hot melt, pressure sensitive, transparent adhesive as generally known in the art. Preferably, acrylic based adhesives such as pressure-sensitive adhesive derived from copolymerizing various organic acrylates and acrylic acid are used. In the case of the liner being completely removed, the adhesive is further selected such that it has no or low tolerance to moisture and as such, can be pacified by wiping with a wet cloth or the like. Typically the adhesive layer is about 1 to 2.5 mil thick, preferably 1 to 1.5 mil thick acrylic based adhesive has been found useful for purposes of this invention.

To further illustrate the invention, the following example is presented.

EXAMPLE

Figure 2:
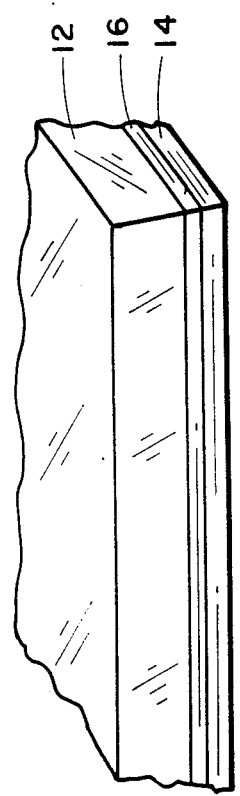
FIG. 2 is an enlarged cross-sectional view of the transparent multilayer film of FIG. 1 illustrating the typical layers and precut perforations.
Figure 3:
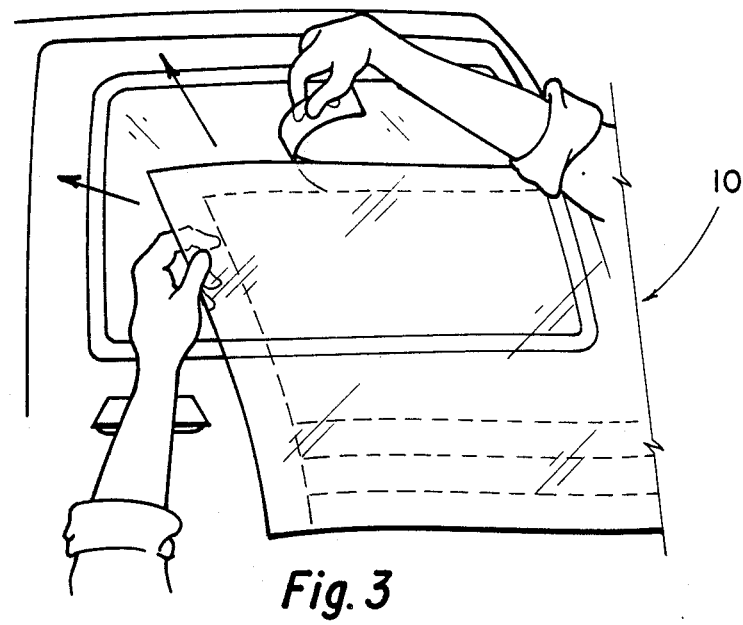
FIGS. 3 through 8 illustrates the typical installation of the transparent temporary window of FIG. 1 on an automobile.
Figure 4:
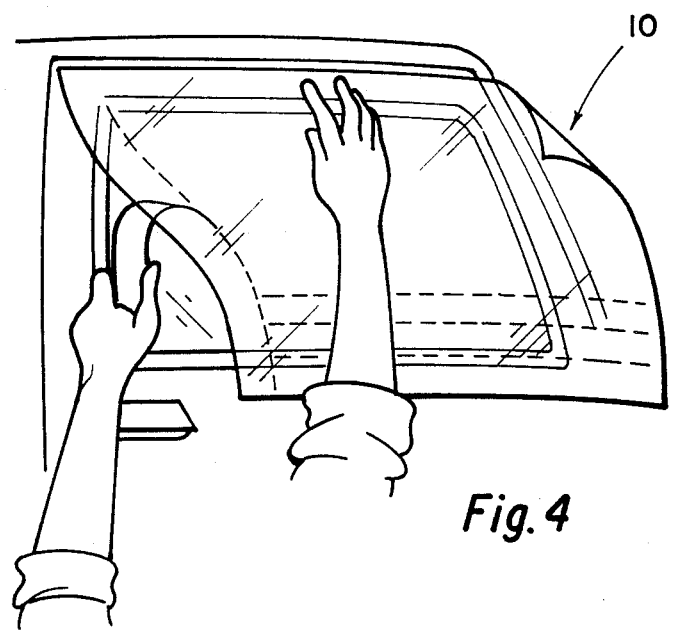
Figure 5:
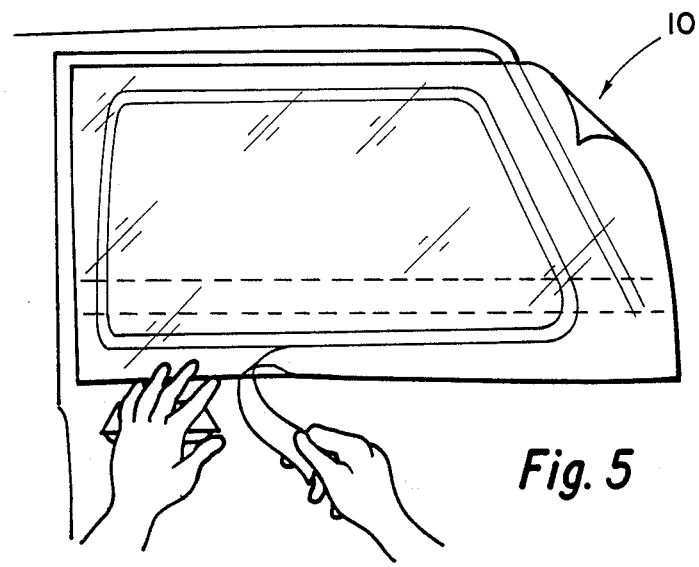
Figure 6:
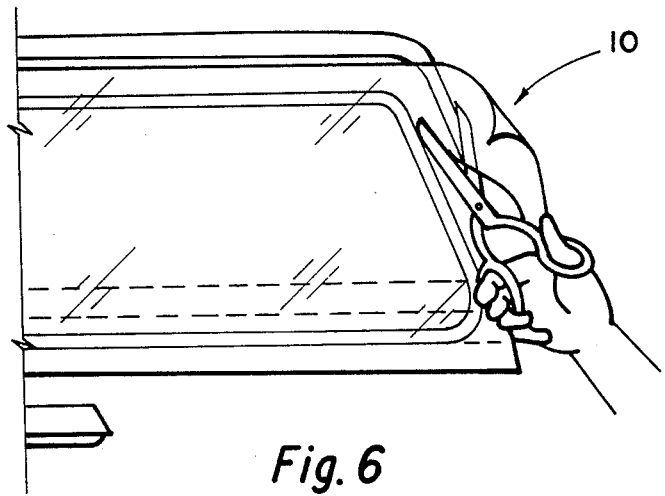

A multilayer composite temporary window as illustrated in FIGS. 1 and 2 was made using 5 mil clear polyethylene terephthalate polyester film supplied by Flexcon Company, Inc. of Spencer, Mass. under the trade name Flex-VU OM500-C MYLAR clear as the substrate. A one mil layer of an ultra clear, thermoset acrylic based pressure sensitive adhesive coating again supplied by Flexcon Company, Inc. under the trade name V22 was applied to the polyester film. A 1.5 mil layer of clear polyester liner also from Flexcon was laminated to the adhesive containing side of the 5 mil clear polyester film. The composite film was cut into individual temporary windows 27 inches high by 52 inches wide as illustrated in FIG. 1. The temporary windows were precut through the polyester film liner layer. The peel off sections (i.e., the position of the dashed lines of FIG. 1) were approximately 2 inches wide leaving a 48 inch by 19 inch transparent central section. The window exhibited the desired moisture barrier properties and reduced sound generation during use.

The advantages and benefits of the present invention are considered numerous and significant. For example, the temporary window according to the present invention is relatively inexpensive and highly versatile in that it can be readily applied to various sizes and shapes of broken windows particularly in automotive type applications. The presence of precut sections along with the ability to separate essentially any part or even all of the surface further facilitates the use of the temporary window. The selection of thickness of the multiple layer transparent film further exhibits the desirable wind noise suppression yet tensile strength and optical clarity is not sacrificed.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

I claim:

1. A temporary window comprising:
   (a) a first layer of flexible transparent film cut to a preselected pattern corresponding to a shape adapted to cover and extend beyond the opening of a window;
   (b) a thin film layer of transparent adhesive applied to one side of said first layer of flexible transparent film; and
   (c) a second layer of flexible transparent film cut to the same preselected pattern of said first layer of flexible transparent film, wherein said second layer of flexible transparent film is superimposed on said thin film layer of transparent adhesive applied to one side of said first layer of flexible transparent film thus forming a multilayer transparent composite and wherein at least one of said layers of flexible transparent film is precut along a plurality of preselected lines that form sections of said precut layer of flexible transparent film that can be peeled away thus exposing said adhesive such as to bond the temporary window in place during use.

2. A temporary window of claim 1 wherein said first layer of flexible transparent film is about 3 mils to about 7 mils thick, said second layer of flexible transparent film is about 1.5 mils to about 3 mils thick and said adhesive layer is about 1 to 2.5.

3. A temporary window of claim 2 wherein said transparent films are selected from the group consisting of clear polyester film and transparent biaxially oriented polypropylene film.

4. A temporary window comprising:
   (a) a layer of flexible transparent film cut to a preselected pattern corresponding to a shape adapted to cover and extend beyond the opening of a window;
   (b) a thin film layer of substantially transparent adhesive applied to one side of said first layer of flexible transparent film wherein said adhesive is further adapted to be rendered passive by application of water; and
   (c) a flexible releasable liner film cut to the same preselected pattern of said layer of flexible transparent film, and superimposed on said thin film layer of 12 substantially transparent adhesive applied to one side of said layer of flexible transparent film.

5. A temporary window of claim 4 wherein said flexible releasable liner is a layer of polymeric film with a release coating of silicone.

6. A temporary window of claim 5 wherein said polymeric film is transparent and precut along a plurality of preselected lines that form sections of said precut releasable liner that can be peeled away thus exposing said adhesive such as to bond the temporary window in place during use.

7. A temporary window of claim 6 wherein said first layer of flexible transparent film is about 3 mils to about 7 mils thick, said second layer of flexible transparent film is about 1.5 mils to about 3 mils thick and said adhesive layer is about 1 to 1.5

8. A temporary window of claim 6 wherein said transparent films are selected from the group consisting of clear polyester film and transparent biaxially oriented polypropylene film.

9. A temporary window comprising:
   (a) a first layer of flexible transparent film cut to a preselected pattern corresponding to a shape adapted to cover and extend beyond the opening of a window;
   (b) a thin film layer of transparent adhesive applied to one side of said first layer of flexible transparent film; and
   (c) a second layer of flexible liner film cut to the same preselected pattern of said first layer of flexible transparent film, wherein said second layer of flexible liner film has a release coating of silicone on one side and said silicone coated side is superimposed on said thin layer of transparent adhesive applied to one side of said layer of flexible transparent film and wherein said second layer of flexible liner film is transparent and precut along a plurality of preselected lines that form sections of said precut releasable liner that can be peeled away thus exposing said adhesive such as to bond the temporary window in place during use.

10. A temporary window of claim 9 wherein said first layer of flexible transparent film is selected from the group consisting of clear polyester film and transparent biaxially oriented polypropylene film of a thickness of about 3 mils to about 10 mils.

* * * * *